April 26, 1966  A. L. WELLFORD  3,248,640
SYNCHRONIZING CIRCUIT

Filed Jan. 23, 1962  2 Sheets-Sheet 1

INVENTOR:
ARMISTEAD L. WELLFORD,
BY James G. Williams
HIS ATTORNEY.

April 26, 1966   A. L. WELLFORD   3,248,640
SYNCHRONIZING CIRCUIT
Filed Jan. 23, 1962   2 Sheets-Sheet 2

INVENTOR:
ARMISTEAD L. WELLFORD,
BY *James J. Williams*
HIS ATTORNEY.

United States Patent Office 3,248,640
Patented Apr. 26, 1966

3,248,640
SYNCHRONIZING CIRCUIT
Armistead L. Wellford, Waynesboro, Va., assignor to General Electric Company, a corporation of New York
Filed Jan. 23, 1962, Ser. No. 168,150
8 Claims. (Cl. 321—45)

The invention relates to a synchronizing circuit, and particularly to a synchronizing circuit for use with a multivibrator having current control devices which are coupled together by a saturable reactance device which effects alternate conduction of the current control devices.

Multivibrators such as just mentioned are used extensively as inverters to produce a variable or alternating current signal from a source of unidirectional or direct current signal. While such inverters perform their desired inversion function, some inverters do not readily lend themselves to synchronization. In inverters in which a saturable reactance device may be the main switching or frequency determining element, the saturable reactance device may make it relatively difficult to provide the precise frequency which may be desired. Also, where a plurality of inverters are used to provide multiphase alternating current signals, the same frequency must be provided by each inverter. Thus, the problem of providing a precise frequency by means of one inverter saturable reactance device is complicated and multiplied by the necessity of providing the same precise frequency from a plurality of inverter saturable reactance devices.

Therefore, an object of the invention is to provide an improved and novel synchronizing circuit for use with a multivibrator having a reactance frequency determining device.

Another object of the invention is to provide a novel synchronizing circuit which permits the frequency of a multivibrator to be synchronized with an external signal.

Another object of the invention is to provide a novel synchronizing circuit which permits the frequency of each of a plurality of multivibrators, each having a reactance frequency determining device, to be synchronized with an external signal.

Another object of the invention is to provide a novel synchronizing circuit which permits the frequency of a multivibrator to be synchronized with an external signal and which permits such synchronization with either a fixed or variable time delay or phase shift.

These and other objects are achieved in accordance with the invention by means of a synchronizing circuit having an alternating current synchronizing signal source (representative of the desired inversion frequency), and a timing device preferably in the form of a saturable reactance. The synchronizing signal source is coupled in a circuit with the timing device, and this circuit is coupled between the control electrodes of the current control devices being used in the multivibrator. A first polarity of the synchronizing signal is used to initiate a first condition of the timing device, this first condition of the timing device causing conduction of one of the current control devices. A second polarity of the synchronizing signal is used to initiate a second condition of the timing device, this second condition of the timing device causing conduction of a second of the current control devices. Conduction of the current control devices may be used to provide inversion. The same synchronizing signal can be used for synchronizing other multivibrators.

The invention will be better understood from the following description given in connection with the accompanying drawing, and its scope will be pointed out in the claims. In the drawing:

Figure 1:
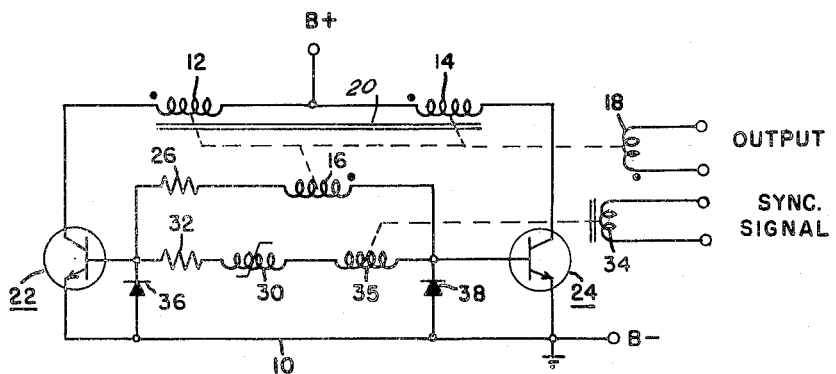
FIGURE 1 shows a schematic diagram of one embodiment of a synchronizing circuit in accordance with the invention.

In the figures, the same reference numerals are used to refer to the same or corresponding parts. The embodiment of FIGURE 1 illustrates the invention as used to invert a source of unidirectional or direct current potential B plus to a recurrently variable potential or alternating current. Other uses may also be made of the invention. The source of potential B plus is positive relative to a reference potential bus 10 which may be grounded as shown. An output transformer, having four windings 12, 14, 16, 18 coupled (as indicated by dashed lines) to a common core 20, is provided. These windings are: a first load winding 12, a second load winding 14, a switching winding 16, and an output winding 18. The relative polarities of these windings are indicated by dots at one end thereof. The load windings 12, 14 are respectively coupled between the source of potential B plus and the collectors of two transistors 22, 24 which, as shown, are of the NPN variety. With appropriate circuit modifications, PNP transistors may be used. The transistors 22, 24 each include an emitter or emitting electrode, a collector or collecting electrode, and a base or control electrode. The emitters of the transistors 22, 24 are coupled to the reference bus 10. The base or control electrodes of the transistors 22, 24 are coupled to a series circuit including the switching winding 16 and a current limiting resistor 26. The bases of the transistors 22, 24 are also coupled to the synchronizing circuit of the invention. The synchronizing circuit includes a timing saturable reactance device 30 which has a core that becomes saturated after a predetermined application of volt-seconds to the winding. The synchronizing circuit includes a current limiting resistor 32 and a source of variable polarity or alternating current synchronizing signal which may be applied by a secondary winding 35 of a transformer 34. Diodes or rectifier devices 36, 38 are respectively coupled between the emitters and base electrodes of the transistors 22, 24, and poled to normally permit current to flow from the emitters to the bases, or in a direction which tends to prevent the current flow in the emitter-collector paths of the transistors 22, 24 when current flows through these diodes.

Figure 2:
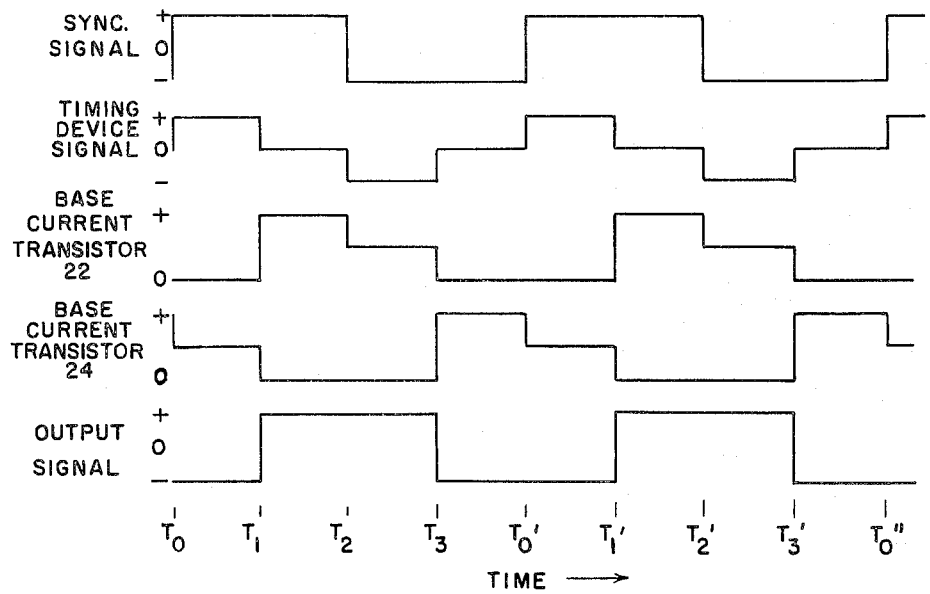
FIGURE 2 shows waveforms for illustrating the operation of the embodiment of FIGURE 1.

The operation of the circuit shown in FIGURE 1 will be explained in connection with the waveforms shown in FIGURE 2. The waveforms of FIGURE 2 are plotted with respect to a common time axis. From top to bottom, these waveforms show: the synchronizing signal, the signal across the timing reactance device 30, the respective base currents of the two transistors 22, 24, and the output signal (which is actually the voltage across any one of the windings 12, 14, 16, 18 of the output transformer). At some time $T_0$, the synchronizing signal makes a transition from minus to plus. With refernce to FIGURE 1, the synchronizing signal polarities refer to the left-hand terminal (i.e., the terminal coupled to the timing reactance device 30) of the secondary winding 35 with respect to the right-hand terminal. Assume that the transistor 22 has not been conducting, and the transistor 24 has been and still is conducting. This is indicated by the base current waveforms. The synchronizing signal causes an arbitrarily designated positive voltage to appear across the timing reactance device 30 as indicated. When the synchronizing signal is plus, it tends to produce a counterclockwise current to flow from the left-hand terminal of the secondary winding 35 through the timing reactance device 30, the resistor 32, downward or backward through the diode 36 (by superposition as a result of an upward or forward current through the diode 36 from a source which will be subsequently explained), and backward or upward through the emitter-base path of the transistor 24 (by superposition as a result of a downward or forward base-emitter current through the transistor 24 from the same source to be explained), back to the right-hand terminal of the secondary winding 35. This current represents the exciting current of the timing reactance device 30 and so it is relatively small. After a predetermined number of volt-seconds (time $T_1$ in FIGURE 2) the timing reactance 30 becomes saturated so that its positive voltage falls substantially to zero. Thus, the full synchronizing signal is applied to the base of the transistor 22. This signal and the circuit component values are designed to provide a current which overcomes the cutoff effect of the previously mentioned current flowing upward through the diode 36 and results in a base emitter current through the transistor 22 as indicated in the waveform at time $T_1$. This base current allows source current to flow from the source B plus through the first load winding 12 and through the collector-emitter path of the transistor 22 to the reference bus 10. This source current produces the positive voltage indicated by the output signal waveform at time $T_1$. This source current also causes the undotted ends of the windings 12, 14, 16, 18 to become positive and the dotted ends to become negative. The switching winding 16 then supplies a current which flows in a counterclockwise direction from its left-hand terminal through the limiting resistor 26, the base-emitter path of the transistor 22, and the diode 38 back to the right-hand terminal of the switching winding 16. This current flow through the diode 38 prevents any base-emitter current from flowing in the transistor 24. The circuit remains in this condition until time $T_2$, when the synchronizing signal goes from plus to minus. It will be recalled that this polarity refers to the left-hand terminal of the secondary winding 35 relative to the right-hand terminal. This synchronizing signal causes an arbitrarily designated negative voltage to appear across the timing reactance device 30. Thus that part of the base-emitter current of the transistor 22 provided by the secondary winding 35 is eliminated as indicated by the drop in the base current waveform for the transistor 22. Only the base-emitter current provided by the switching winding 16 remains in the transistor 22. Also at time $T_2$ when the synchronizing signal becomes negative, exciting current flows in a clockwise direction from the right-hand terminal of the secondary winding 35 backward or downward through the diode 38 (by superposition as a result of the upward or forward current through the diode 38 as supplied by the switching winding 16; this being the same source which was previously mentioned with respect to the other diode 36), backward or upward through the emitter-base path of the transistor 22 (by superposition as a result of the downward or forward base-emitter current through the transistor 22 as supplied by the switching winding 16), the resistor 32, and the timing reactance device 30 back to the left-hand terminal of the secondary winding 35. After the predetermined number of volt-seconds (time $T_3$ in FIGURE 2), the timing reactance device 30 becomes saturated so that its negative voltage falls substantially to zero. Thus the full synchronizing signal is applied to the base of the transistor 24. As in the previous part of the cycle at time $T_1$, this signal and the circuit component values are designed to provide a current which overcomes the cutoff effect of the previously mentioned current flowing upward through the diode 38 and results in a base-emitter current through the transistor 24 as indicated in the waveform at time $T_3$. This base current allows source current to flow from the source B plus through the second load winding 14 and through the collector-emitter path of the transistor 24 to the reference bus 10. This source current produces the negative voltage indicated by the output signal waveform at time $T_3$. This source current also causes the dotted ends of the windings 12, 14, 16, 18 to become positive and the undotted ends to become negative. The switching winding 16 then supplies a current which flows in a clockwise direction from its right-hand terminal through the base-emitter path of the transistor 24, the diode 36, and the limiting resistor 26 back to the left-hand terminal of the switching winding 16. This current flow through the diode 36 prevents any base-emitter current from flowing in the transistor 22, and is the same current mentioned previously which permits superposition current to flow through the diode 36. The circuit remains in this condition until time $T_0'$, this being a corresponding part of a new cycle such as the cycle just described which began at time $T_0$. Corresponding portions of this new cycle are indicated by the corresponding times provided with a prime. At $T_0'$, the synchronizing signal again goes from minus to plus. This synchronizing signal causes a positive voltage to appear across the timing reactance device 30 so that part of the base-emitter current of the transistor 24 provided by the secondary winding 35 is eliminated as indicated by the drop in the base current waveform for the transistor 24. Only the base emitter current provided by the switching winding 16 remains in the transistor 24. The circuit is now in the same condition which was assumed and described above as beginning at time $T_0$. A new cycle starts and continues to be followed by additional cycles as long as appropriate voltages and signals are applied.

It will thus be seen that the output signal provided by the output winding 18 of the output transformer in synchronized with the synchronizing signal and will have the same frequency as the frequency of the synchronizing signal. Thus far, the description has referred to a number of volt-seconds for the timing reactance device 30. If the timing reactance device 30 is provided with a fixed volt-second characteristic and if the synchronizing signal has a substantially fixed voltage level, then the output signal will have a phase lag (substantially fixed) relative to the synchronizing signal, but again it will have the same frequency as the frequency of the synchronizing signal. This output signal may be utilized in any manner desired, such as in an inverter circuit. It will be appreciated that a number of circuits such as shown in FIGURE 1 may be utilized and synchronized with signals from a single synchronizing signal source to provide a plurality of output signals having the same synchronized frequency. Appropriate circuitry may be utilized with these output signals to provide a relatively fixed or variable phase shift between them to provide a multiphase output signal.

Figure 3:
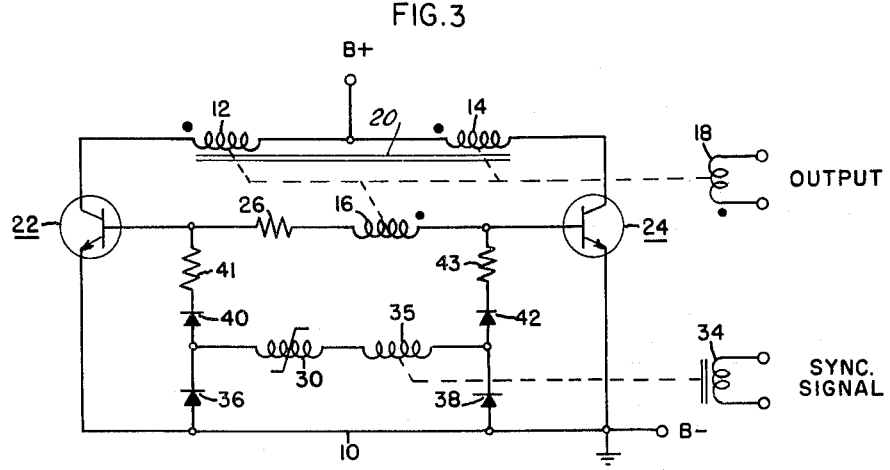
FIGURES 3 and 4 show schematic diagrams of two other embodiments of synchronizing circuits in accordance with the invention.

The circuit shown in FIGURE 1 is preferably used with germanium transistors because of the inherently low voltage drop across the base-emitter path of such transistors. Further, the circuit of FIGURE 1 is advantageous where a high frequency or rate of switching is desired, because the current which tends to turn one transistor on also tends to turn the other transistor off. In situations where silicon transistors are desired, the circuit of FIGURE 3 may be used to reduce the effect of unpredictable and a wide range of base-emitter voltage drops across such transistors. In FIGURE 3, parts corresponding to those of FIGURE 1 have been given the same reference numerals. The synchronizing circuit of FIGURE 3 has been arranged so that it does not require the emitter-base superposition current flow through the transistors 22, 24. This is accomplished by the use of additional rectifier devices or diodes 40, 42 and current limiting resistors 41, 43 respectively coupled between the bases of the transistors 22, 24 and the diodes 36, 38. The operation of the circuit of FIGURE 3 is similar to the operation of the circuit of FIGURE 1. However, exciting current provided by the secondary winding 35 either flows in a clockwise direction from the right-hand terminal of the secondary winding 35 backward (by superposition) through the diode 38, forward through the diode 36, and through the timing reactance device 30 back to the left-hand terminal of the secondary winding 35; or flows in a counterclockwise direction from the left-hand terminal of the secondary winding 35 through the timing reactance device 30, backward (by superposition) through the diode 36, and forward through the diode 38 back to the right-hand terminal of the secondary winding 35. As soon as the timing reactance device 30 is saturated, current then flows either through the timing reactance device 30, the diode 40, the limiting resistor 41, the base-emitter path of the transistor 22, and the diode 38 to initiate switching in one direction; or flows through the diode 42, the limiting resistor 43, the base-emitter path of the transistor 24, the diode 36, and the timing reactance device 30 to initiate switching in the other direction.

Figure 4:
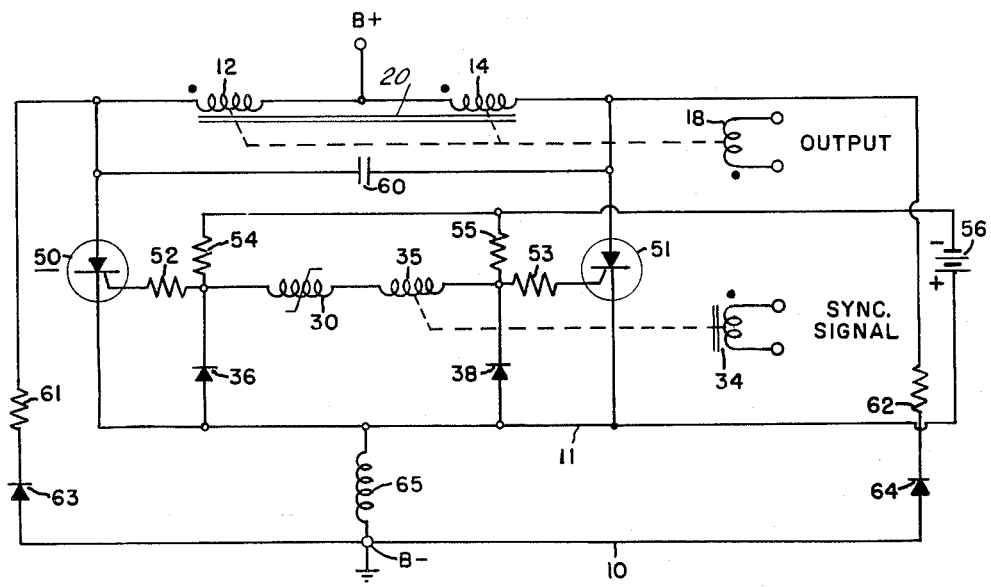

FIGURE 4 shows the invention as used with silicon controlled rectifiers 50, 51 instead of transistors. Corresponding parts of the circuit of FIGURE 4 have been given the same reference numerals as the parts in the circuits of FIGURES 1 and 3. The rectifiers 50, 51 each include emitting, control, and collecting electrodes. As known in the art, silicon controlled rectifiers do not require a continuous control electrode signal once they are fired or are in the state of conduction in the emitting-collecting electrode path. Thus, the circuit of FIGURE 4 does not require the switching winding 16 of the output transformer. Since this switching winding 16 is not required, a bias supply 56 is provided and applied through current limiting resistors 54, 55 to the synchronizing circuit. The bias supply 56 may be a suitable source of unidirection potential which has its positive terminal connected to the bus 11 and its negative terminal connected to the current limiting resistors 54, 55. Thus, forward current is continuously provided through the diodes 36, 38 to permit exciting current to flow either clockwise or counterclockwise from the secondary winding 35 through the timing reactance device 30 and the diodes 36, 38. The resistors 52, 53 are respectively coupled between the control electrodes of the silicon controlled rectifiers 50, 51 and the synchronizing circuit. These resistors 52, 53 are provided to limit the synchronizing current once the timing reactance device 30 is saturated. The operation of the circuit of FIGURE 4 is similar to the operation of the circuits of FIGURES 1 and 3, the synchronizing signal alternately firing the silicon controlled rectifiers 50, 51. Turnoff of the rectifiers is appropriately provided by a commutating circuit such as shown in FIGURE 4. This circuit includes a capacitor 60 connected across the load windings 12, 14, and a choke 65 coupled between the controlled rectifiers 50, 51 and the diodes 36, 38 and the reference bus 10. Resistors 61, 62 and diodes or rectifier devices 63, 64 are respectively coupled in series between the load windings 12, 14 and the reference bus 10 as shown. This commutating circuit is known in the art and serves to turn off the controlled rectifiers 50, 51 at the appropriate time. Other commutating circuits may also be used.

In the various circuits shown, an adjustment of the time delay may be provided by an appropriate adjustment of the timing reactance device 30. This may be accomplished by selectable taps on the winding of the timing reactance device 30 or the secondary winding 35 or by other suitable means. In addition, a small adjustment may be made by varying the magnitude of the current limiting resistor 32 in FIGURE 1. Since this resistor is not present in the synchronizing circuit portions of FIGURES 3 and 4, such a comparable resistor would have to be added in series with the timing reactance device 30 if such an adjustment were desired.

It will be seen that the synchronizing circuit of the invention provides a new and novel means for synchronizing the frequency of a multivibrator. This synchronizing circuit is used for timing in both portions of a cycle, and thus provide equal length half-cycles without the need for matching components. It is to be understood that modifications may be made by persons skilled in the art without departing from the spirit of the invention or from the scope o the claims.

What I claim as new and desire to secure by Letters Patent of the United States is:

1. In a switching circuit having a plurality of current control devices each having control, emitting, and collecting electrodes and having a first transformer device to effect alternate conduction of said current control devices, a synchronizing circuit comprising a rectifier device respectively coupled to each of said control electrodes in a manner such that current flow through said rectifier device tends to prevent current flow between said emitting and collecting electrodes, a source of alternating current synchronizing signals, a timing device, and means coupling said synchronizing signal source and said timing device in a circuit between said control electrodes for selectively rendering said current control devices conductive in response to said synchronizing signal and said timing device.

2. In a switching circuit having a plurality of current control devices each having control, emitting, and collecting electrodes and having a transformer device to effect alternate conduction of said current control devices, a synchronizing circuit comprising a source of alternating current synchronizing signals, a timing saturable reactance device, an exciting current path for said timing reactance device, and means coupling said synchronizing signal source, said timing device, and said exciting current path to said control electrodes for selectively rendering said current control devices conductive in response to said synchronizing signal and saturation of said timing device.

3. In a switching circuit having a plurality of current cotrol devices each having control, emitting, and collecting electrodes and having a transformer device to effect alternate conduction of said current control devices, a synchronizing circuit comprising a rectifier device respectively coupled to each of said control electrodes in a manner such that current flow through said rectifier device tends to prevent current flow between said emitting and collecting electrodes, a source of alternating current synchronizing signals, a timing saturable reactance device, and means coupling said synchronizing signal source and said timing device in a circuit between said control electrodes for selectively rendering said current control devices conductive in response to said synchronizing signal and saturation of said timing device.

4. In a multivibrator having a plurality of current control devices each having a control electrode and having emitting and collecting electrodes forming an emitting-collecting electrode path, and having transformer windings coupled between a source of potential and said emitting-collecting electrode paths of said current control devices to effect alternate conduction of said current control devices, a synchronizing circuit comprising a rectifier device coupled between each of said emitting-collecting electrode paths and said control electrodes respectively in a manner such that current flow through said rectifier device tends to prevent current flow through the respective emitting-collecting path, a source of alternating current synchronizing signals, a timing saturable reactance device, and means coupling said synchronizing signal source and said timing device in series between said control electrodes for selectively rendering said emitting-collecting path of each of said current control devices conductive in response to said synchronizing signal and saturation of said timing device.

5. In a multivibrator having a plurality of current control devices each having a control electrode and having emitting and collecting electrodes forming an emitting-collecting electrode path, and having a transformer device having windings respectively coupled between a source of potential and said emitting-collecing electrode paths of said current control devices and coupled between said control electrodes to effect alternate conduction of said current control devices, a synchronizing circuit comprising a rectifier device coupled between each of said emitting-collecting electrode paths and said control electrodes respectively in a manner such that current flow through said rectifier device tends to prevent current flow through the respective emitting-collecting path, a source of alternating current synchronizing signals, a timing saturable reactance device, means coupling said synchronizing signal source and said timing device in series between said control electrodes for selectively rendering said emitting-collecting path of each of said current control devices conductive in response to said synchronizing signal and saturation of said timing device, and means coupled to said transformer device to derive an output therefrom.

6. In a multivibrator having a plurality of current control devices each having a control electrode and having emitting and collecting electrodes forming an emitting-collecting electrode path, and having transformer windings coupled between a source of potential and said emitting-collecting electrode paths of said current control devices to effect alternate conduction of said current control devices, a synchronizing circuit comprising a plurality of rectifier devices serially coupled between each of said emitting-collecting electrode paths and said control electrodes respectively in a manner such that current flow through said rectifier devices tends to prevent current flow through the respective emitting-collecting path, a source of alternating current synchronizing signals, a timing saturable reactance device, and means coupling said synchronizing signal source and said timing device in series between respective junctions of said rectifier devices for selectively rendering said emitting-collecting path of each of said current control devices conductive in response to said synchronizing signal and saturation of said timing device.

7. In a multivibrator having a plurality of current control devices each having a control electrode and having emitting and collecting electrodes forming an emitting-collecting electrode path, and having a transformer device having windings respectively coupled between a source of potential and said emitting-collecting electrode paths of said current control devices and coupled between said control electrodes to effect alternate conduction of said current control devices, a synchronizing circuit comprising a plurality of rectifier devices serially coupled between each of said emitting-collecting electrode paths and said control electrodes respectively in a manner such that current flow through said rectifier devices tends to prevent current flow through the respective emitting-collecting path, a source of alternating current synchronizing signals, a timing saturable reactance device, means coupling said synchronizing signal source and said timing device in series between respective junctions of said rectifier devices for selectively rendering said emitting-collecting path of each of said current control devices conductive in response to said synchronizing signal and saturation of said timing device, and means coupled to said transformer device to derive an output therefrom.

8. In a multivibrator having a plurality of current control devices each having a control electrode and having emitting and collecting electrodes forming an emitting-collecting electrode path and having transformer windings coupled between a source of potential and said emitting-collecting electrode paths of said current control devices to effect alternate conduction of said current control devices, a synchronizing circuit comprising a rectifier device coupled between each of said emitting-collecting electrode paths and said control electrodes respectively, a bias source coupled to said rectifier devices to produce a current flow through said rectifier device which tends to reduce the current flow through said emitting-collecting paths, a source of alternating current synchronizing signals, a timing saturable reactance device, and means coupling said synchronizing signal source and said timing device in series between said control electrodes for selectively rendering said emitting-collecting path of each of said current control devices conductive in response to said synchronizing signal and saturation of said timing device.

References Cited by the Examiner
UNITED STATES PATENTS

| | | | |
|---|---|---|---|
| 2,783,384 | 2/1957 | Bright et al. | 321—44 |
| 2,849,614 | 8/1958 | Royer et al. | 331—13 |
| 3,067,378 | 12/1962 | Paynter | 321—2 X |

MILTON O. HIRSHFIELD, *Primary Examiner.*

LLOYD McCOLLUM, *Examiner.*